(12) United States Patent
Ye et al.

(10) Patent No.: US 12,471,056 B2
(45) Date of Patent: Nov. 11, 2025

(54) SIDELINK PAGING FOR A WIRELESS DEVICE

(71) Applicant: Apple Inc., Cupertino, CA (US)

(72) Inventors: Chunxuan Ye, San Diego, CA (US);
Yushu Zhang, Beijing (CN); Dawei Zhang, Saratoga, CA (US); Haijing Hu, Los Gatos, CA (US); Haitong Sun, Cupertino, CA (US); Wei Zeng, Saratoga, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 234 days.

(21) Appl. No.: 17/593,831

(22) PCT Filed: Oct. 15, 2020

(86) PCT No.: PCT/CN2020/121312
§ 371 (c)(1),
(2) Date: Sep. 24, 2021

(87) PCT Pub. No.: WO2022/077391
PCT Pub. Date: Apr. 21, 2022

(65) Prior Publication Data
US 2023/0239834 A1    Jul. 27, 2023

(51) Int. Cl.
*H04W 68/00* (2009.01)
*H04W 72/044* (2023.01)
(Continued)

(52) U.S. Cl.
CPC ......... *H04W 68/00* (2013.01); *H04W 72/044* (2013.01); *H04W 72/40* (2023.01); *H04W 76/14* (2018.02)

(58) Field of Classification Search
CPC ... H04W 68/00; H04W 72/044; H04W 72/40; H04W 76/14; H04W 72/20;
(Continued)

(56) References Cited

U.S. PATENT DOCUMENTS

2011/0244893 A1* 10/2011 Wang ............... H04W 68/025
455/458
2017/0367069 A1* 12/2017 Agiwal .............. H04B 7/088
(Continued)

FOREIGN PATENT DOCUMENTS

WO    2017213687 A1    12/2017
WO    2018064477 A1    4/2018
(Continued)

OTHER PUBLICATIONS

Samsung, "Considerations for Sidelink Resource Pool Design for NR V2X," 3GPP TSG-RAN WG2 Meeting #103bis, R2-1814304, Sep. 2018.
(Continued)

*Primary Examiner* — Matthew D. Anderson
*Assistant Examiner* — Abdullah Al Mamun
(74) *Attorney, Agent, or Firm* — Blank Rome LLP

(57) ABSTRACT

A technique for power saving for a wireless device, the technique including determining, by a first wireless device, a set of resources for communicating directly with a second wireless device the set of resources including a first set of paging resources, establishing a sidelink session with the second wireless device based on the set of resources, entering, by the first wireless device, a reduced power state, monitoring, by the first wireless device and based on the paging schedule, the first set of paging resources, receiving, from the second wireless device, a paging message, exiting the reduced power state based on the received paging
(Continued)

message, and monitoring, based on the received paging message, the set of resources.

17 Claims, 14 Drawing Sheets

(51) Int. Cl.
*H04W 72/40* (2023.01)
*H04W 76/14* (2018.01)

(58) Field of Classification Search
CPC ......... H04W 52/0216; H04W 52/0229; H04W 52/0258; H04W 52/028; H04W 68/005; H04W 92/18; H04W 72/02; H04W 68/02; Y02D 30/70
See application file for complete search history.

(56) References Cited

U.S. PATENT DOCUMENTS

| | | | |
|---|---|---|---|
| 2018/0014345 A1 | 1/2018 | Sartori | |
| 2019/0223145 A1* | 7/2019 | Jung | H04W 48/12 |
| 2020/0120634 A1* | 4/2020 | Lee | H04W 24/10 |
| 2020/0187152 A1* | 6/2020 | Karampatsis | H04W 4/06 |
| 2020/0314940 A1 | 10/2020 | Park | |
| 2021/0058893 A1* | 2/2021 | Sha | H04W 52/0235 |
| 2021/0152992 A1* | 5/2021 | Balasubramanian | H04W 72/02 |
| 2021/0329590 A1* | 10/2021 | Balasubramanian | H04W 76/14 |
| 2022/0110058 A1* | 4/2022 | Hosseini | H04L 1/0025 |
| 2023/0082507 A1* | 3/2023 | Mcmenamy | H04W 72/20 370/315 |
| 2023/0092324 A1* | 3/2023 | Seidel | H04W 36/06 370/329 |

FOREIGN PATENT DOCUMENTS

| | | | | |
|---|---|---|---|---|
| WO | WO-2018084796 A1 * | 5/2018 | | H04B 7/15 |
| WO | 2018223401 A1 | 12/2018 | | |
| WO | 2020146634 A1 | 7/2020 | | |

OTHER PUBLICATIONS

Intel Corporation, "Paging for remote UE," 3GPP Draft, vol. RAN WG2 Meeting #97, R2-1701303, Feb. 12, 2017, XP051211968, Retrieved from the Internet: URL: http://www.3gpporg/ftp/Meetings_3GPP_SYNC/RAN2/Docs/ [retrieved on Feb. 12, 2017].

* cited by examiner

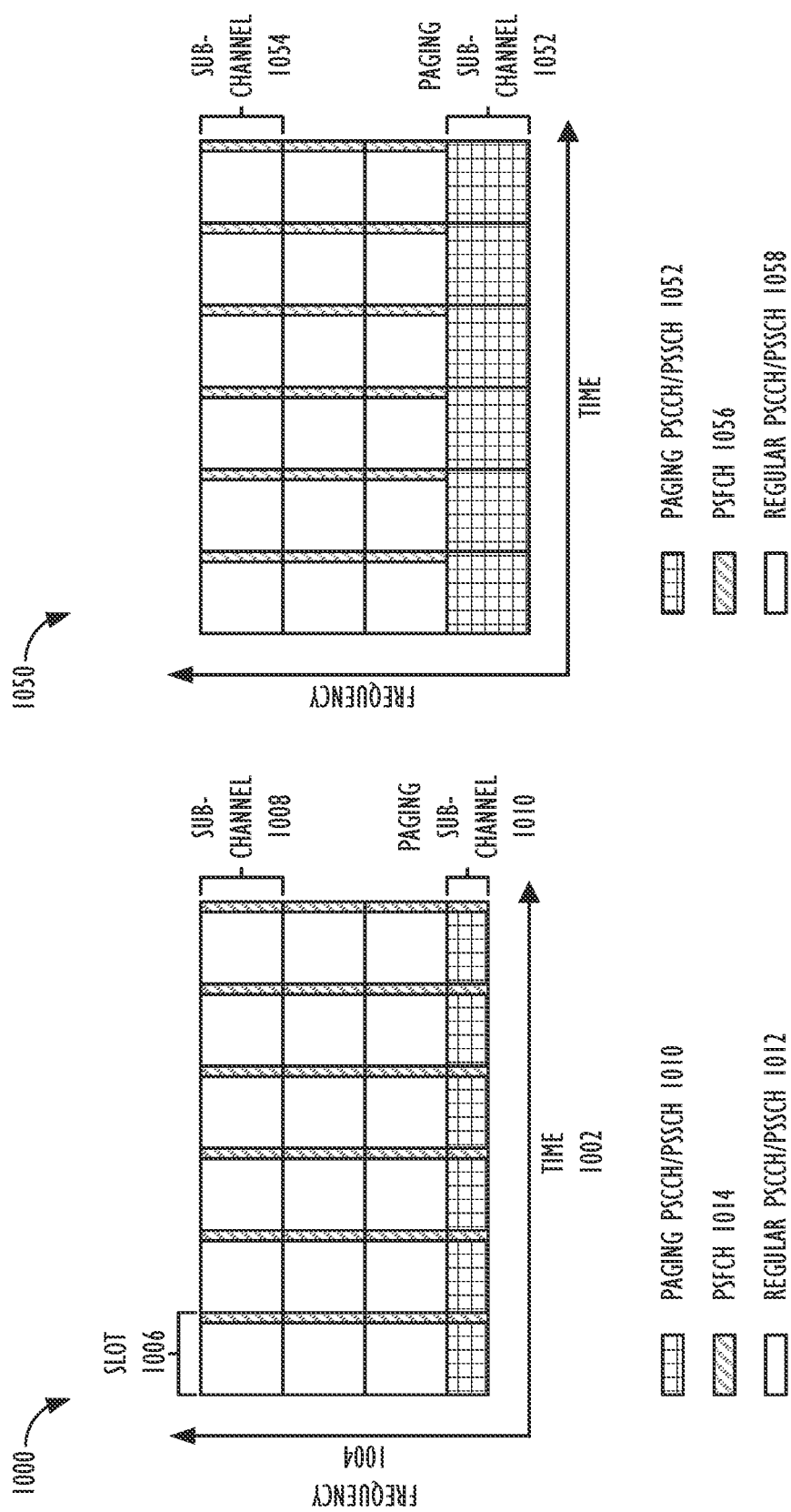

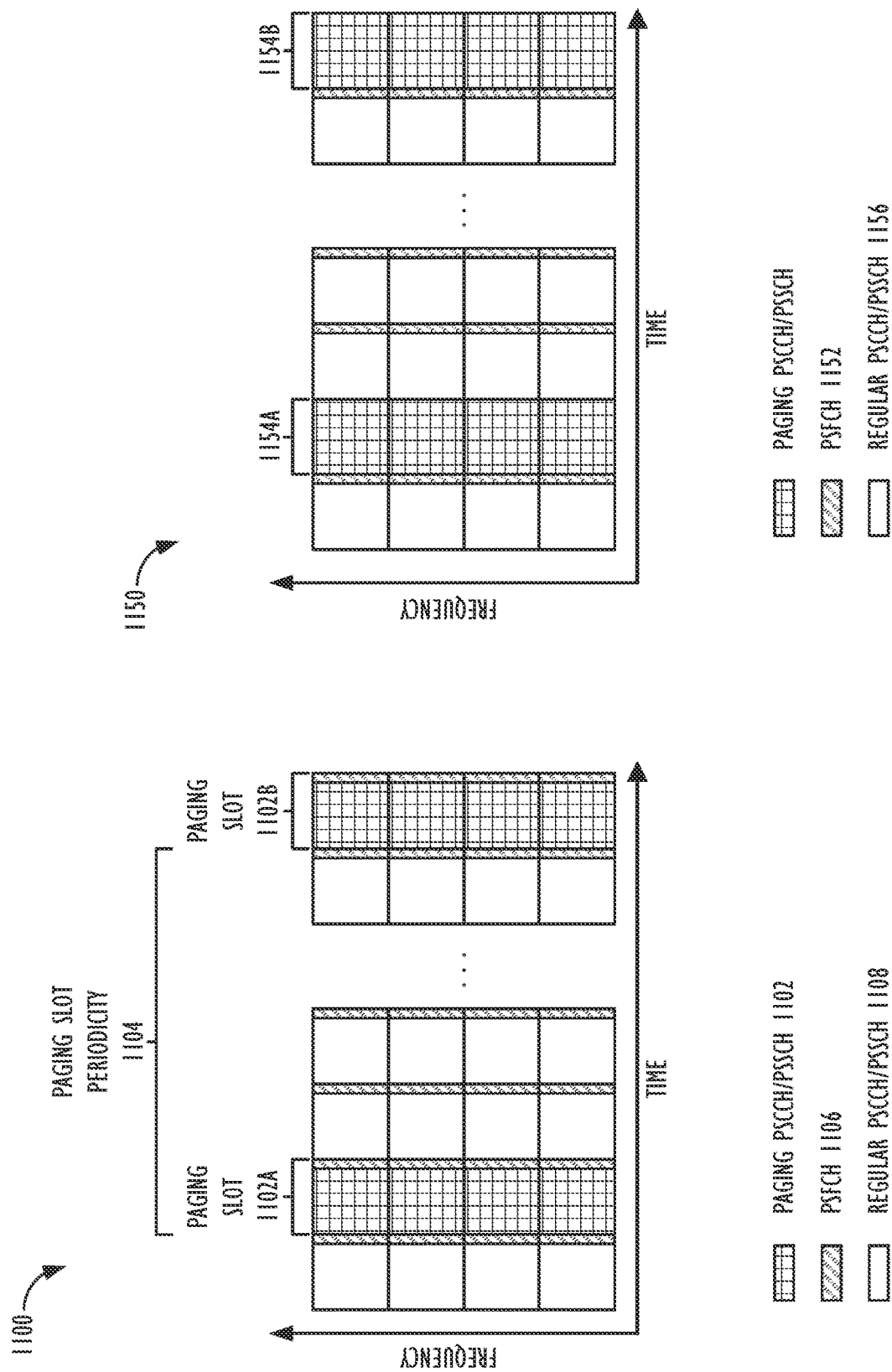

SIDELINK PAGING FOR A WIRELESS DEVICE

FIELD

The present application relates to wireless devices and wireless networks including devices, computer-readable media, and methods for sidelink paging.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Aspects relate to devices, computer-readable media, and methods for power saving for a wireless device. These aspects may include determining, by a first wireless device, a set of resources for communicating directly with a second wireless device the set of resources including a first set of paging resources, establishing a sidelink session with the second wireless device based on the set of resources, entering, by the first wireless device, a reduced power state, monitoring, by the first wireless device and based on the paging schedule, the first set of paging resources, receiving, from the second wireless device, a paging message, receiving, from the second wireless device, a paging message, exiting the reduced power state based on the received paging message, and monitoring, based on the received paging message, the set of resources.

Another aspect relates to apparatuses, systems, and methods for power saving comprising: determining, by a first wireless device, a set of resources for communicating directly with a second wireless device, the set of resources including a first set of paging resources, establishing a sidelink session with the second wireless device based on the set of resources, determining to transmit data to the second wireless device, selecting a paging resource, of the first set of paging resources for transmitting a paging message, transmitting, to the second wireless device, the paging message on the determined paging resource, and transmitting, to the second wireless device, the data.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings.

FIGS. 10A-10B are resource grids illustrating sidelink paging resources, in accordance with aspects of the present disclosure.

FIGS. 11A-11B are resource grids illustrating sidelink paging resources, in accordance with aspects of the present disclosure.

FIGS. 14A and 14B are resource grids illustrating monitoring in response to paging, in accordance to aspects of the present disclosure. In some cases, the time information may indicate a time period when the wireless device intends to transmit.

Figure 1:
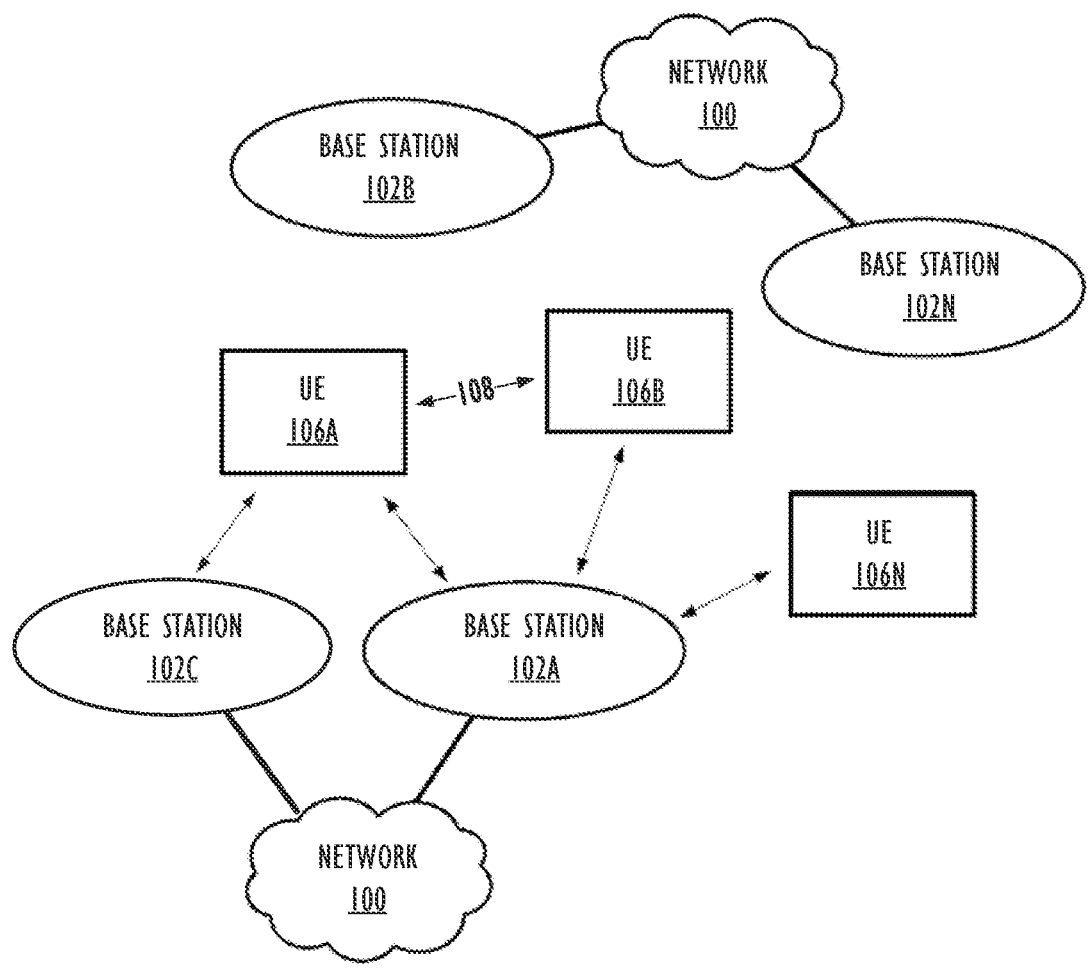
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In certain wireless communications systems, a wireless device may communicate directly with another wireless device without being routed through, for example, a wireless node. For example, a wireless device may establish a sidelink session with another peer wireless device. Once the sidelink session is established, the wireless device may listen for messages from the other peer wireless device and vice versa. To help reduce power consumption, sidelink discontinuous reception (DRX) may be implemented to allow the wireless devices to only listen for messages during a certain time period. What is desired is a technique for paging to further reduce power consumption.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device, a computer system memory or random access memory such as DRAM, DDR RAM, SRAM, EDO RAM. Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays). PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the term "UE" or "UE device" can be broadly defined to encompass any electronic, computing, and/or telecommunications device (or combination of devices) which is transportable by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" or "wireless station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE. LTE-Advanced (LTE-A), 5G new radio (5G NR). HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some embodiments, the UEs 106 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, etc.) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a physical sidelink shared channel (PSSCH), a physical sidelink control channel (PSCCH), a physical sidelink shared channel (PSSCH), a physical sidelink downlink channel (PSDCH), a physical sidelink broadcast channel (PSBCH), and a physical sidelink feedback channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
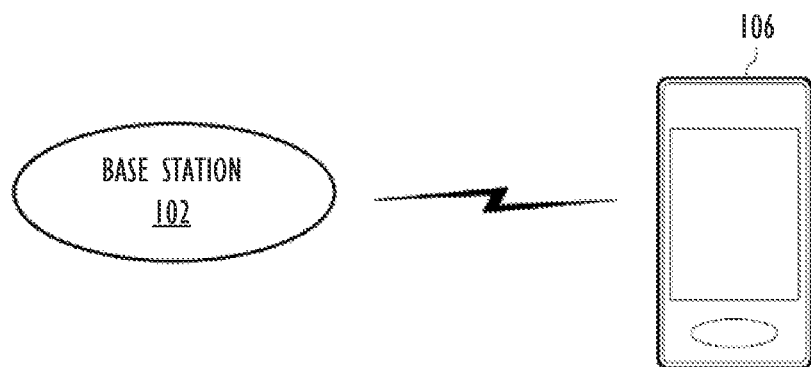
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/ or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example. NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some embodiments, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 106 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Example Communication Device

Figure 3:
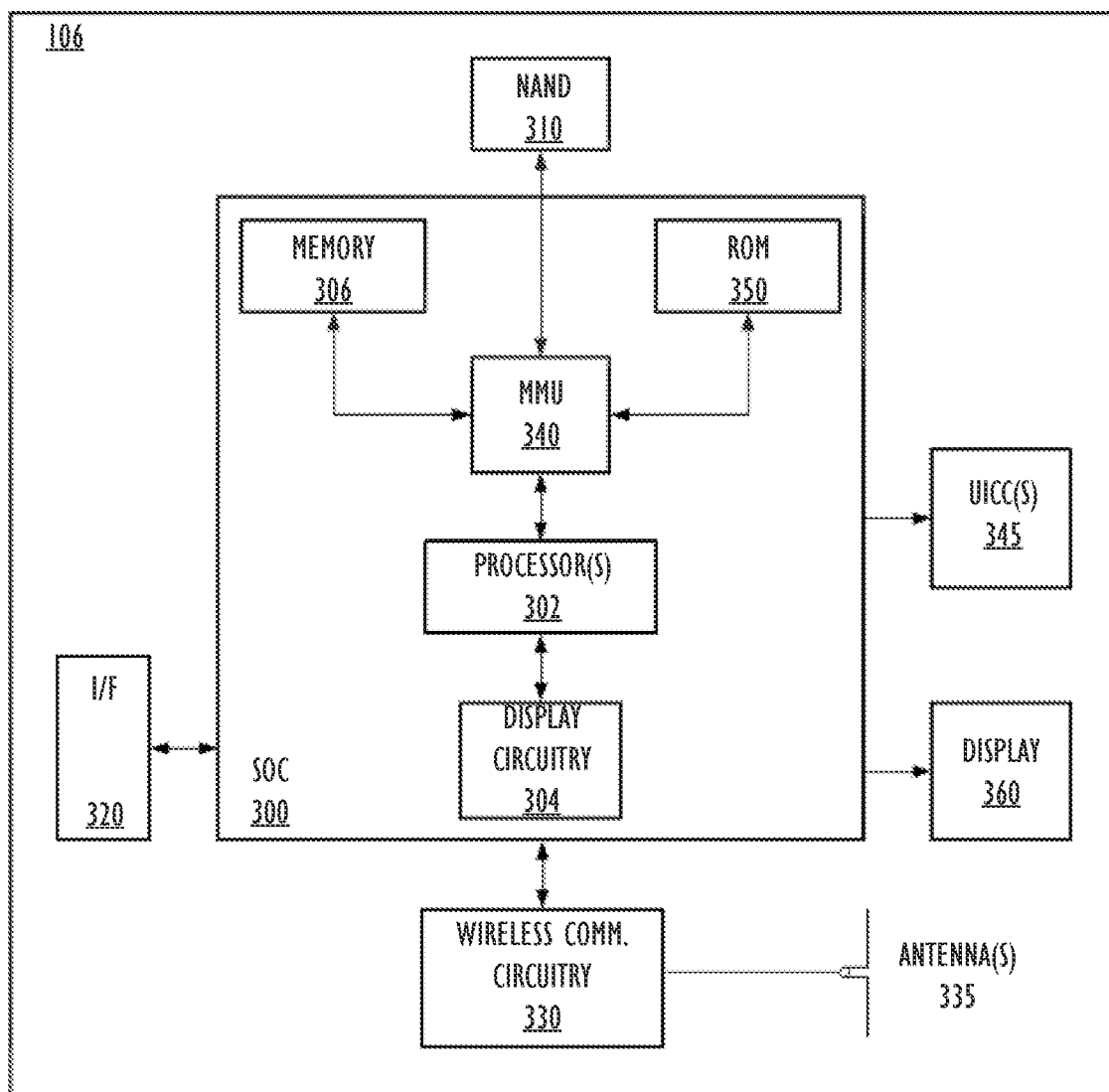
FIG. 3 illustrates an example block diagram of a UE, according to some Aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively, directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
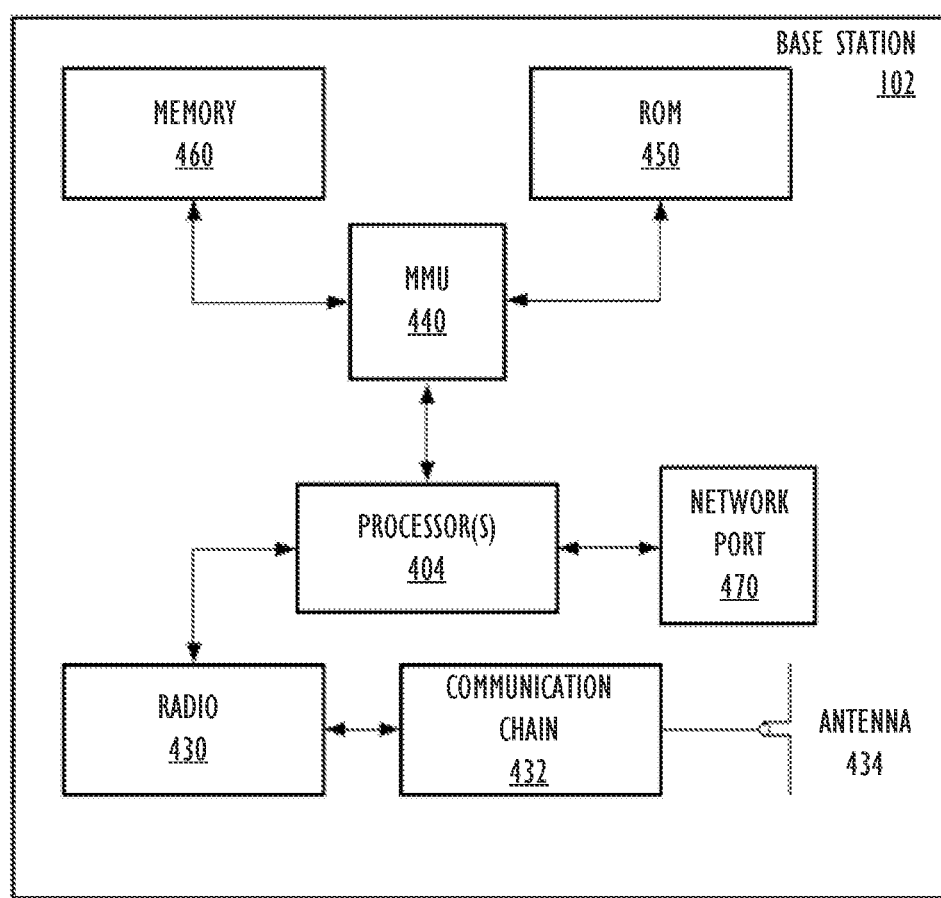
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
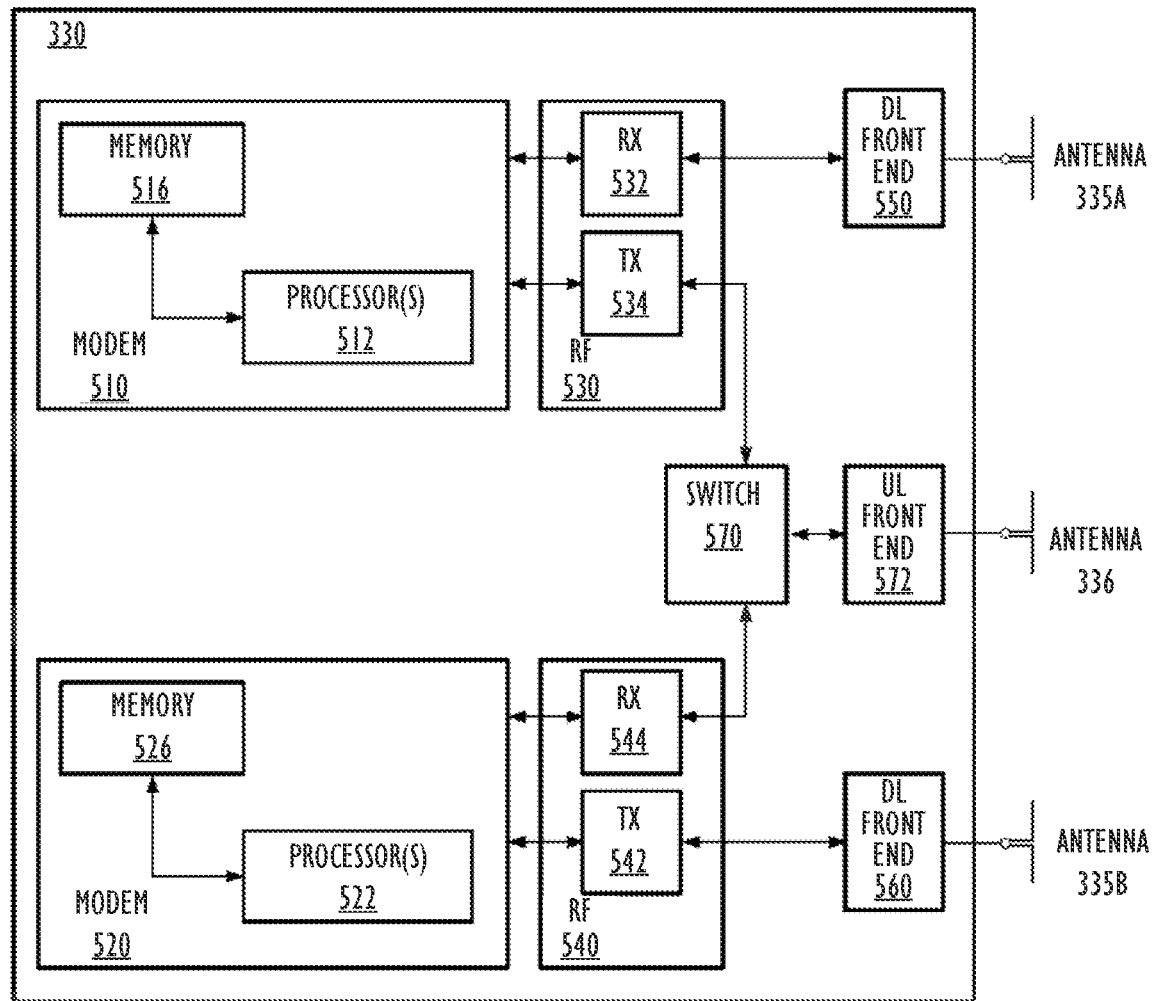
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit, other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
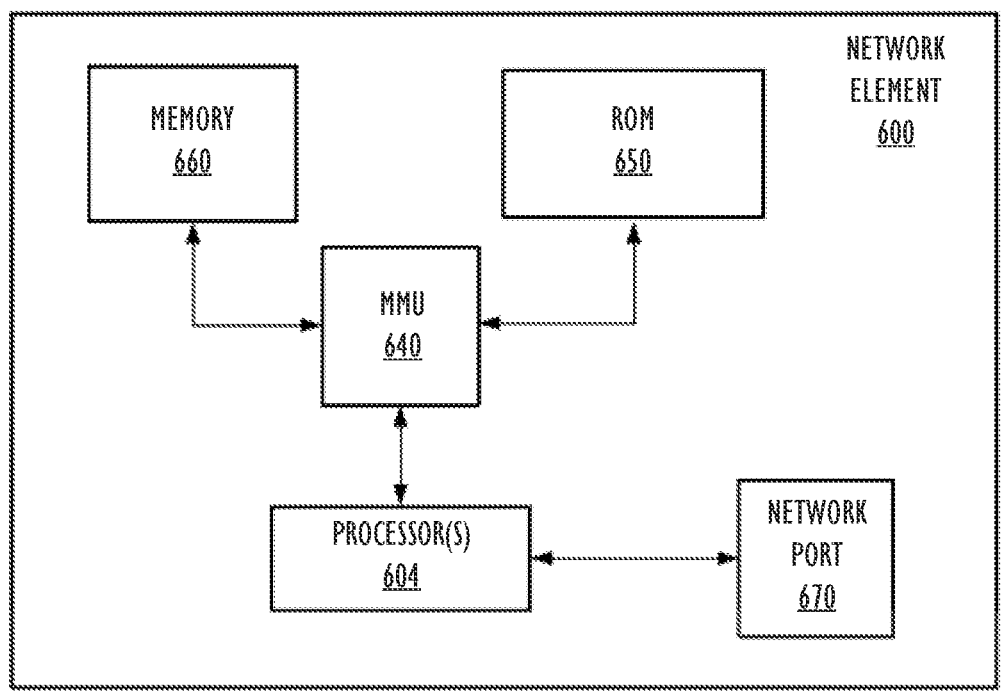
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein. e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Discontinuous Reception (DRX)

In some wireless networks, discontinuous reception (DRX) is used to increase wireless device battery life. A wireless device may use a set of resources (e.g., time, frequency) for downlink from the wireless network. Without DRX, a wireless device would actively monitor for a signal from the wireless network with the entire set of resources. DRX allows a wireless device to monitor for a signal from the wireless network with a subset of the resources. For example, DRX may follow a DRX cycle where for a first period of time the wireless device is in an active state to monitor for a scheduling signal from the wireless network, and during the remainder of the DRX cycle the wireless device may enter into a relatively lower power state (e.g., sleep state) if a scheduling message is not received. Thus, the wireless device can skip downlink channels from the wireless network to improve battery performance.

Figure 7:
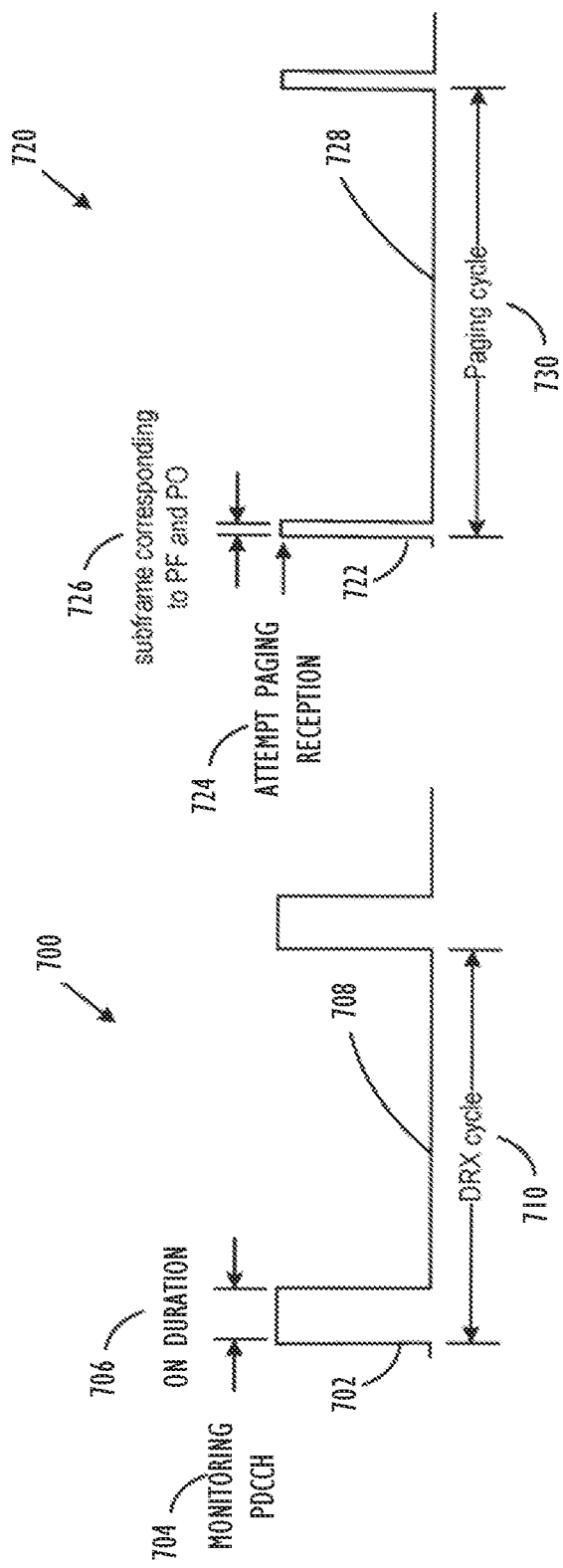
FIG. 7 illustrates DRX operation for a wireless device in a wireless system in both a radio resource control (RRC) connected mode and an idle mode, in accordance with aspects of the present disclosure.

FIG. 7 illustrates DRX operation for a wireless device in a wireless system in both a radio resource control (RRC) connected mode 700 and an idle mode 720, in accordance with aspects of the present disclosure. DRX mechanisms may be supported for both the RRC connected mode 700 and the idle mode 720 for power saving.

For RRC connected mode 700, a wireless device connects to a wireless node and enters an active state 702 to monitor 704 a physical downlink control channel (PDCCH) during an on duration period 706. If the wireless device does not receive any scheduling information during the on duration period 706, the wireless device can enter a sleep state 708 during a remaining DRX cycle 710. If the wireless device receives a scheduling information, an inactivity timer (re) starts. The wireless device can enter a sleep state during any period remaining in the DRX cycle after the inactivity timer ends.

For a wireless device not connected to a wireless node and in an RRC idle mode 720, the wireless device enters an active state 722 to attempt to receive paging 724 in a subframe 726 corresponding to paging frame (PF) and paging occasion (PO) calculated defined by the rule. Normally, the idle UE also performs measurement during the active state 722 and can enter a sleep state 728 in a remaining paging cycle 730.

Sidelink Communications

In a sidelink scenario, the wireless device is communicating directly with other wireless devices without communications having to be routed through a wireless node. For sidelink connections between wireless devices, according to some implementations, a dedicated sidelink resource pool may be determined for wireless devices. In some cases, the sidelink resource pool may be determined based on sidelink modes that the wireless devices are in. For example, two sidelink modes may be defined in some cases. In the first sidelink mode, the wireless device may obtain sidelink resource pool information from a wireless network, for example, via a configuration message such as a DCI format 3_0 message from a wireless node. In the second sidelink mode, a transmitting wireless device may sense a physical medium, such as a set of radio frequencies, to determine a set of unused frequency resources, and select from the set of unused frequency resources, the sidelink resource pool. A set of rules may be defined for how the frequency resources may be selected and the frequency resources may vary based on a location of the wireless device. In the second sidelink mode, one or more of the wireless devices may be either connected, not connected, or outside of a wireless network coverage area.

In some cases, from the reception point of view, a wireless device may monitor all possible resources from the sidelink resource pool. The continual monitoring may not be desirable for power efficiency. In order to reduce the power consumption used to monitor the sidelink resource pool, DRX mechanisms for sidelink may be implemented. In some cases, device-to-device communication (for both transmission and reception) over sidelink may be done in LTE uplink frequency bands.

Sidelinks (e.g., via the PC5 interface) are the logical direct interface between wireless devices. In some embodiments of DRX for sidelinks, a wireless node configures coordinated resources (or coordinated DRX timing information) for a relay wireless device and other wireless device, such as remote wireless devices. In some embodiments, the relay wireless device directly configures dedicated sidelink resources (or DRX timing information) to the remote wireless devices and informs that configuration to the wireless node. In other embodiments, the relay wireless device and remote wireless devices may determine DRX timing information for the remote wireless devices implicitly based on a defined set of rules (e.g., using device ids).

Figure 8:
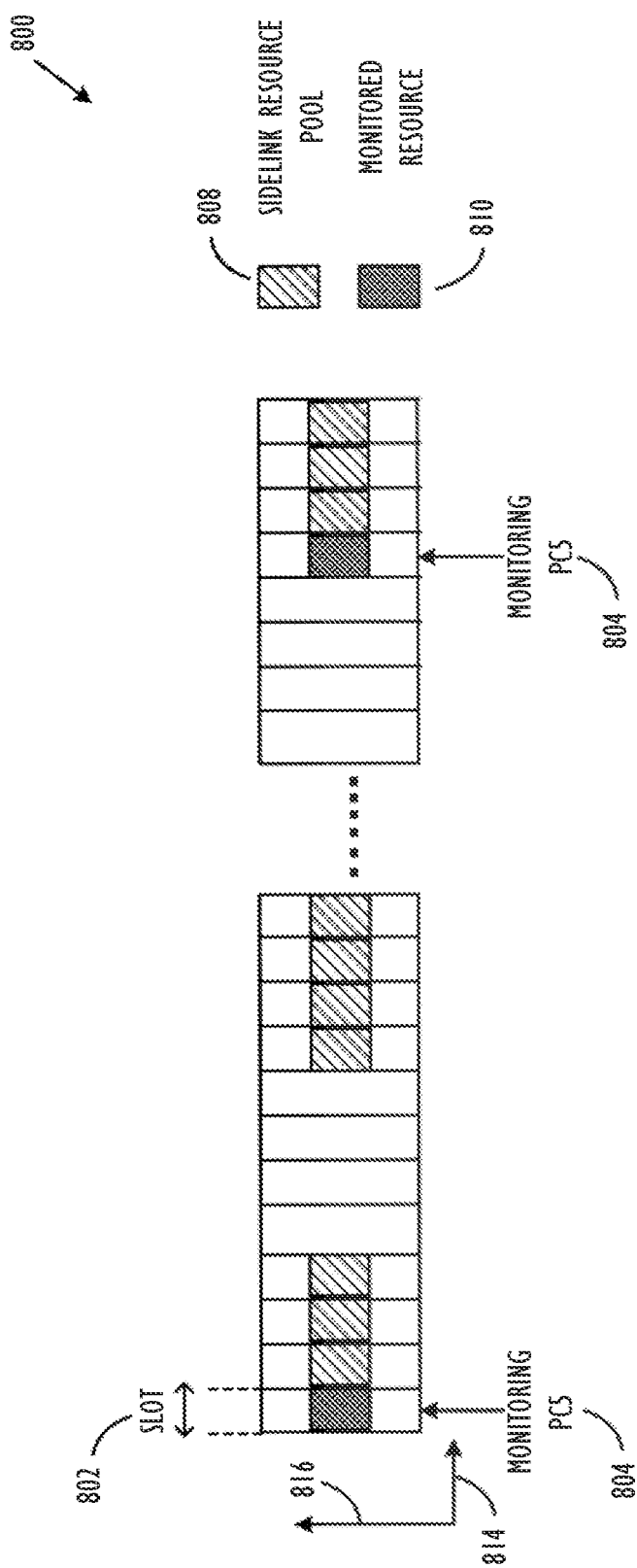
FIG. 8 illustrates DRX operation on a sidelink of a remote wireless device, in accordance with aspects of the present disclosure.

FIG. 8 illustrates DRX operation on a sidelink 800 of a remote wireless device, in accordance with aspects of the present disclosure. Resources of a remote wireless device may include resources in both a frequency-domain 816 and a time-domain 814. For example, in the time-domain 814, the resources of a remote wireless device may be segmented into periods of time or slots 802. One or more portions of the resources of the remote wireless device may be used for sidelink (e.g., the sidelink resources pool 808). In some cases, DRX mechanisms may be used so that the remote wireless device can monitor 804 a subset of the sidelink resources pool 808. The example embodiment shown in FIG. 8 illustrates a DRX mechanism implemented to conserve the time-domain 814 resources. In other embodiments DRX mechanisms may conserve the frequency-domain 812 resources in addition to or instead of the time-domain 814 resources.

Each sidelink may include a dedicated resource pool for a sidelink comprising the monitoring resources 810 and non-monitoring resources 808. The remote wireless device may monitor for a signal on the sidelink using the monitoring resources 810 in an active state and enter a sleep state during the non-monitoring resources 808. The monitoring periods or resources 804 may be configured by either a relay wireless device or a wireless node, as discussed above. A dedicated resource pool includes part of whole resource pools. In some cases, the dedicated resource pool is made of discontinuous resources in either the time-domain, frequency-domain, or both.

As shown, the remote wireless device monitors part of a whole dedicated resource pool. For example, in some embodiments, only a few slots in the time-domain may be monitored, allowing the remote wireless device to enter a sleep state during the remaining subframes. In FIG. 8, the whole RX resource pool for device-to-device communication includes time periods or subframes designated as the monitoring resources 810 and non-monitoring resources 808. The monitoring resources 810 in reference to FIG. 8 indicate periods of times where the remote wireless device monitors (e.g., does reception operation) on the sidelink interface. Non-monitoring resources 808 are subframes in which the wireless device may enter a sleep state or receive additional data based on a scheduling signal received during the monitoring resources 810.

The dedicated RX resource pool may be specific for a sidelink between a relay wireless device and the remote wireless device. In some cases, the resources may be discontinuous. For example, the resources may be located at multiple, frequencies. Accordingly, the relay wireless device transmits information using a corresponding dedicated transmit (TX) resource pool specific to the sidelink. For example, a corresponding dedicated TX resource pool may include a starting subframe to transmit data through the sidelink to the remote wireless device during the monitoring resources 810.

Monitoring resources during the DRX on duration, rather than constantly monitoring the whole resources pool helps reduce power consumption of the wireless device as the wireless device may enter a relatively low power state (e.g., sleep, or other lower power state) as compared to when constantly monitoring the whole resources pool. For example, the wireless device may partially or completely power down the RF front end, modem, one or more processors, and/or other component that may be used to monitor the resources pool. While monitoring during the DRX on durations can help reduce power consumption, additional power savings can be had by further reducing the amount of monitoring needed.

Sidelink Paging

According to aspects of the present disclosure, paging may be used in conjunction with DRX for sidelink communications to indicate to a wireless device whether the wireless device should monitor an upcoming DRX on duration. For example, prior to an upcoming DRX on duration, a first wireless device may listen for a paging message from a second wireless device during a paging occasion. If the first wireless device receives a paging message, the first wireless device can enter a higher power state and listen on monitoring resources allocated to the first wireless device during the DRX on duration. If the first wireless device does not receive a paging message during the paging occasion, then the first wireless device may remain in the lower power state and skipping monitoring during the DRX on duration. In some DRX and paging in sidelink communications is challenging as the wireless devices may coordinate with each other to establish DRX durations and paging intervals. A design for paging resource allocation and procedures for establishing paging are thus needed for sidelink paging.

Figure 9A:
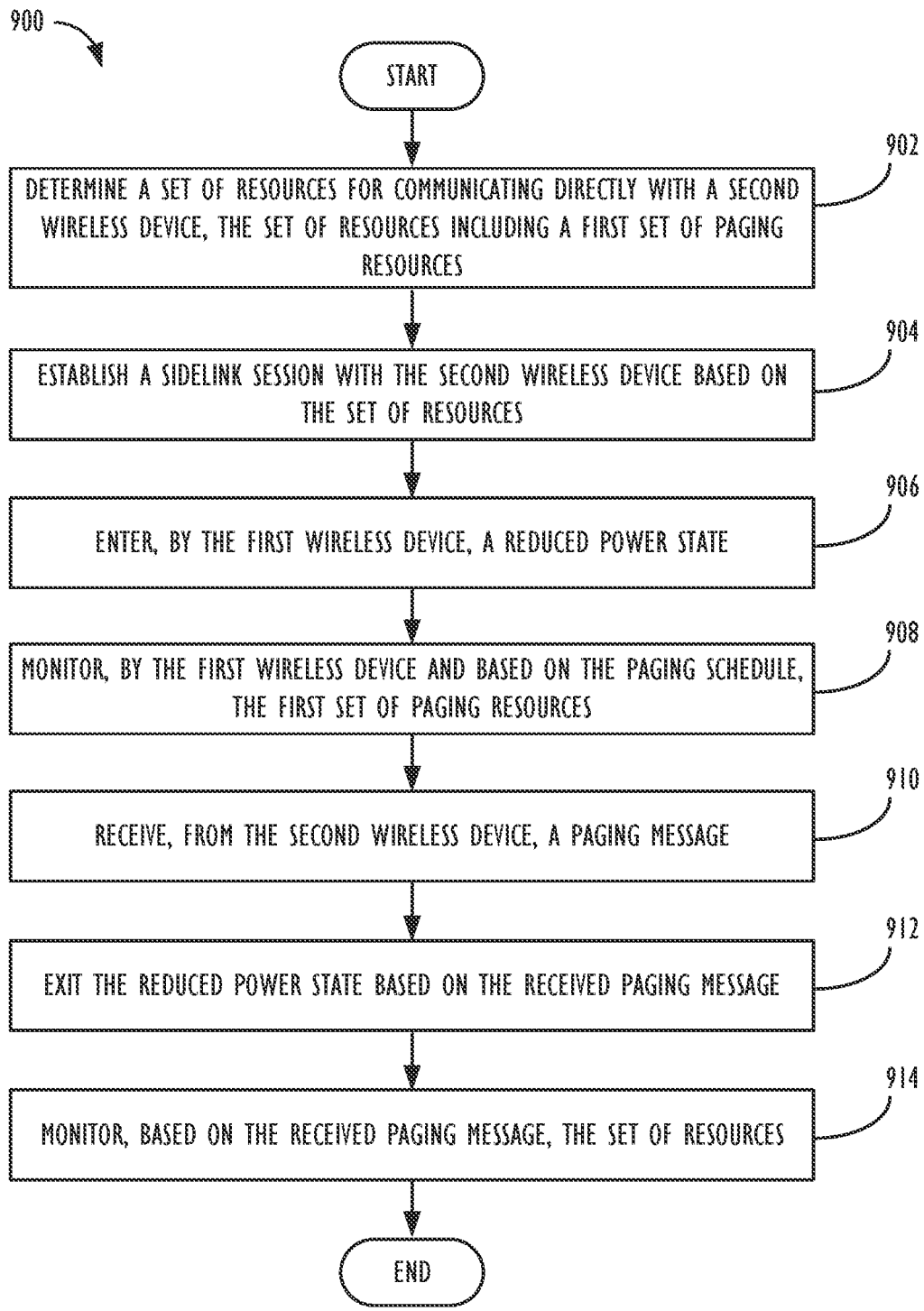
FIGS. 9A-9B are flowcharts illustrating overviews of sidelink paging, in accordance with aspects of the present disclosure.

FIG. 9A is a flowchart 900 illustrating an overview of sidelink paging, in accordance with aspects of the present disclosure. The example shown in flowchart 900 illustrates steps that may be performed by a first wireless device for receiving sidelink data from one or more peer wireless devices. At block 902, the first wireless device may determine a set of resources for communicating directly with a second wireless device, the set of resources including a first set of paging resources. For example, the wireless device may obtain sidelink resources pool configuration information. This configuration information may include paging resource information. In some cases, the wireless device may be operating in a first sidelink mode and the wireless device may receive sidelink resources pool information from a wireless network. The sidelink resources pool information may include information indicating a paging resource configuration. In some cases, the first set of paging resources comprise a one or more sub-channels. In some cases, the one or more sub-channels are dedicated for paging. In some cases, the one or more sub-channels are configured with a physical sidelink feedback channel. In some cases, the one or more sub-channels are associated with a different sub-channel size than another sidelink sub-channel. In some cases, the first set of paging resources comprise at least a portion of one or more slots. In some cases, the at least a portion of one or more slots are dedicated for paging. In some cases, the at least a portion of one or more slots are configured with a physical sidelink feedback channel. In some cases, the first set of paging resources comprise one or more dedicated resource blocks. In some cases, the first set of paging resources comprise one or more dedicated symbols in a slot.

At block 904, a sidelink session may be established with the second wireless device based on the set of resources. For example, the wireless device may monitor the sidelink resources pool and establish a sidelink session with a peer wireless device. In some cases, the first wireless device may select a subset of the first set of paging resources, transmit, to the second wireless device, an indication of the selected subset of the first set of paging resources, receive a configuration message, the configuration message indicating a second set of paging resources for the first wireless device, and monitoring the second set of paging resources instead of the first set of paging resources.

At block 906, the first wireless device may enter a reduced power state. In some cases, entering the reduced power state comprises monitoring the second set of paging resources instead of the first set of paging resources. In some cases, entering the reduced power state is based on a timer. In some cases, the first wireless device may receive, a reduced power trigger message, and wherein entering the reduced power state is based on the received reduced power trigger message.

At block 908, the first wireless device may monitor, based on the paging schedule, the first set of paging resources. In some cases, the paging message indicating includes an identifier for the first wireless device and an identifier for the second wireless device. In some cases, the paging message includes an indication of a starting time to monitor for a sidelink transmission. For example, the paging message may include a start time for monitoring the sidelink resources pool. In some cases, the paging message further includes an indication of a sub-channel and a time to monitor for the sidelink transmission. For example, the paging message may include a time and sub-channel index for the sidelink transmission. In some cases, the paging message is received on a physical sidelink shared channel (PSSCH). In some cases, the paging message is included in a sidelink control information (SCI) message received on one of a physical sidelink shared channel (PSSCH) or a physical sidelink control channel (PSCCH). In some cases, the paging message is included in a sidelink control information (SCI) message included in a physical sidelink control channel, wherein the paging message includes an indication that the SCI message is a paging message.

At block 910, the first wireless device receives, from the second wireless device, a paging message. In some cases, the first wireless device may transmit to the second wireless device, an acknowledgment message in response to the received paging message. In some cases, the acknowledgement message is transmitted in a physical sidelink feedback channel (PSFCH). In some cases, the acknowledgement message is transmitted in a physical sidelink control channel in a sidelink control information (SCI) message. At block 912, the first wireless device may exit the reduced power state based on the received paging message. At block 914, the first wireless device may monitor, based on the received paging message, the set of resources.

Figure 9B:
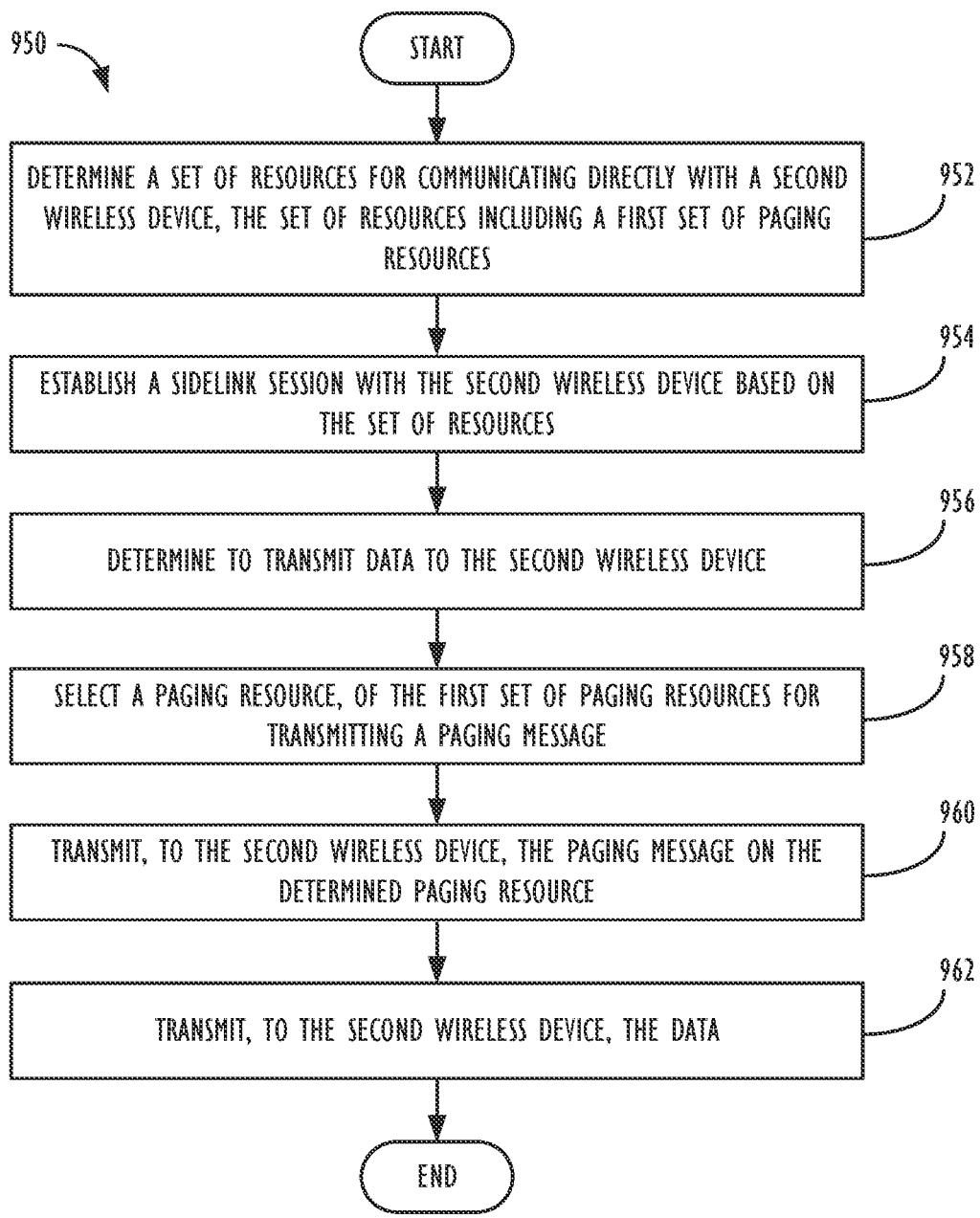

FIG. 9B is a flowchart 950 illustrating an overview of sidelink paging, in accordance with aspects of the present disclosure. At block 952, the first wireless device may determine a set of resources for communicating directly with a second wireless device, the set of resources including a first set of paging resources. For example, the wireless device may obtain sidelink resources pool configuration information. This configuration information may include paging resource information. In some cases, the wireless device may be operating in a first sidelink mode and the wireless device may receive sidelink resources pool information from a wireless network. The sidelink resources pool information may include information indicating a paging resource configuration. In some cases, the first set of paging resources comprise a one or more sub-channels. In some cases, the one or more sub-channels are dedicated for paging. In some cases, the one or more sub-channels are configured with a physical sidelink feedback channel. In some cases, the one or more sub-channels are associated with a different sub-channel size than another sidelink sub-channel. In some cases, the first set of paging resources comprise at least a portion of one or more slots. In some cases, the at least a portion of one or more slots are dedicated for paging. In some cases, the at least a portion of one or more slots are configured with a physical sidelink feedback channel. In some cases, the first set of paging resources comprise one or more dedicated resource blocks. In some cases, the first set of paging resources comprise one or more dedicated symbols in a slot.

At block 954, the first wireless device may establish a sidelink session with the second wireless device based on the set of resources. In some cases, the first wireless device may receive an indication of a selected subset of the first set of paging resources, select a second set of paging resources based on the indicated selected subset, and transmit, to the second wireless device, a configuration message, the configuration message indicating the second set of paging resources for the first wireless device. At block 956, the first wireless device may determine to transmit data to the second wireless device. For example, the first wireless device may need to transmit data to the second wireless device. At block 958, the first wireless device may select a paging resource, of the first set of paging resources for transmitting a paging message. In some cases, selecting the paging resource comprises randomly selecting the paging resources from the first or second set of paging resources. In some cases, selecting the paging resource comprises: monitoring, by the first wireless device, a set of sensing resources, and determining, based on the monitoring, the paging resource. In some cases, the set of sensing resources comprises the paging resources. In some cases, the set of sensing resources comprises the set of resources for communicating directly with the second wireless device.

At block 960, the first wireless device transmits, to the second wireless device, the paging message on the determined paging resource. In some cases, the paging message indicating includes an identifier for the first wireless device and an identifier for the second wireless device. In some cases, the paging message includes an indication of a starting time to monitor for a sidelink transmission. For example, the paging message may include a start time for monitoring the sidelink resources pool. In some cases, the paging message further includes an indication of a sub-channel and a time to monitor for the sidelink transmission. For example, the paging message may include a time and sub-channel index for the sidelink transmission. In some cases, the paging message is received on a physical sidelink shared channel (PSSCH). In some cases, the paging message is included in a sidelink control information (SCI) message in the PSSCH. In some cases, the paging message is included in a sidelink control information (SCI) message included in a physical sidelink control channel, wherein the paging message includes an indication that the SCI message is a paging message. At block 962, the first wireless device transmits, to the second wireless device, the data. In some cases, the first wireless device may also transmit a reduced power trigger message. In some cases, the first wireless device enters a reduced power state based at least in part on the set of paging resources. In some cases, entering the reduced power state is based on a timer.

Sidelink Paging Resources Configuration

FIGS. 10A and 10B are resource grids illustrating sidelink paging resources, in accordance with aspects of the present disclosure. Resource grid 1000 in FIG. 10A includes a set of radio frequency resources available in the sidelink resource pool. The sidelink resource pool may be a set of radio frequency resources available for sidelink communications. As shown in this example, the sidelink resource pool may be represented along a time axis 1002 and a frequency axis 1004. Each column along the time axis 1002 represents a slot 1006 in a radio frame and each row along the frequency axis 1004 represent a sub-channel 1008 of the sidelink resource pool. A sub-channel (e.g., subcarrier) represents a logical division of a wider frequency channel in narrower frequency blocks, for example by applying a transformation function.

In some cases, sidelink paging resources may be configured so that paging may be performed in dedicated frequency domain resources. For example, a paging sub-channel 1010 from the sidelink resources pool may be allocated specifically for paging messaging. Sidelink paging resources may represent paging occasions where a wireless device may receive or transmit paging information. As shown, a height of the sub-channel in resource grids 1000 and 1050 represents an amount of frequency resources allocated to the sub-channel. In some cases, the paging sub-channel 1052 may have a sub-channel size that is the same as other sub-channels of the sidelink resources pool, such as sub-channel 1054. In other cases, the paging sub-channel 1010 may have a different sub-channel size configuration than other sub-channels of the sidelink resources pool, such as sub-channel 1008. For example, the paging sub-channel 1010 may have a smaller sub-channel size as compared to sub-channel 1008 of the sidelink resources pool which are allocated for other channels, such as PSCCH/PSSCH 1012. In some cases, PSFCH resources 1014 may be configured within the dedicated paging sub-channel 1010. The PSFCH resources 1014 may be used to provide paging feedback in some cases, as shown in resource grid 1000. In other cases, such as shown in resource grid 1050, PSFCH resources 1056 allocated for the paging sub-channel 1052 may be different as compared to PSFCH resources 1056 allocated for other channels, such as PSCCH/PSSCH 1058. In some cases, PSFCH resources 1056 may be not allocated in the paging sub-channel 1052.

In some cases, sidelink paging resources may be configured so that paging may be performed in frequency domain resources which are shared with regular sidelink transmissions, such as those carrying regular PSCCH/PSSCH 1012. In such cases, sidelink paging data and other data may be carried in the frequency domain resources allocated for sidelink paging, but sidelink paging data may only be carried in the frequency domain resources allocated for sidelink paging.

FIGS. 11A and 11B are resource grids illustrating sidelink paging resources, in accordance with aspects of the present disclosure. In some cases, sidelink paging resources may be configured so that paging may be performed in dedicated time domain resources, such as sidelink paging slots 1102A and 1102B across the set of sub-channels of resource grid 1100. A periodicity of the sidelink paging slots, that is, a pattern in time for when the sidelink paging slots are scheduled, may be configurable, for example, based on relative velocity of the wireless devices, location, etc. In some cases, the periodicity of the sidelink paging slots may be predetermined, such as based on a standard.

In some cases, as shown in resource grid 1100, PSFCH resources 1106 may be configured within sidelink paging slots 1102A and 1102B in a same way as PSFCH resources 1106 within other slots, such as slots allocated for other PSCCH/PSSCH 1108 transmissions. In other cases, such as shown in resource grid 1150, PSFCH resources 1152 may be configured differently within sidelink paging slots 1154A and 1154B as compared to other slots, such as slots allocated for other PSCCH/PSSCH 1156 transmissions. In some cases, PSFCH resources 1152 may not be allocated in sidelink paging slots 1154A and 1154B.

Sidelink paging resources may be configured so that paging may be performed in time domain resources which are shared with regular sidelink transmissions, such as those slots which carried on the PSCCH/PSSCH, in some cases. In such cases, sidelink paging data and other data may be carried in slots allocated for sidelink paging, but sidelink paging data may only be carried in the slots allocated for sidelink paging.

Figure 12B:
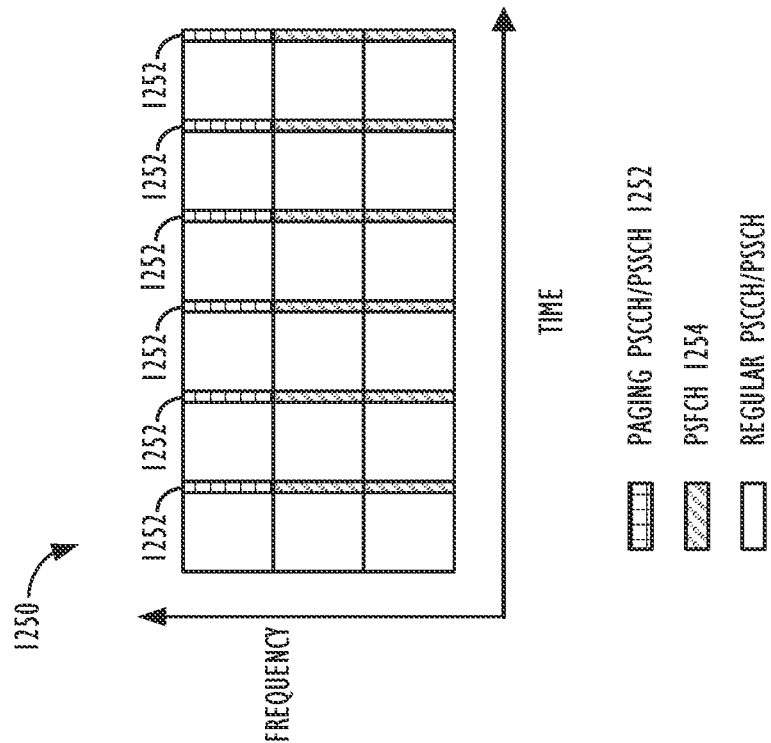
FIGS. 12A-12B are resource grids illustrating sidelink paging resources, in accordance with aspects of the present disclosure.
Figure 12A:
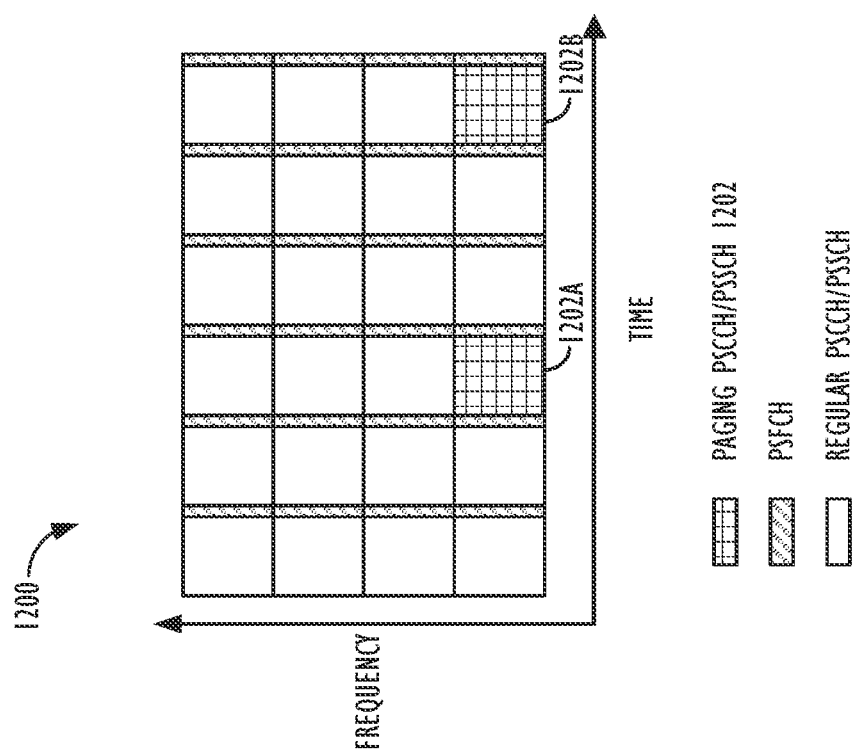

FIGS. 12A and 12B are resource grids illustrating sidelink paging resources, in accordance with aspects of the present disclosure. In some cases, sidelink paging resources may be configured with dedicated time and frequency resources. For example, as shown in resource grid 1200, one or more paging slots 1202A and 1202B within specific sub-channels may be allocated as sidelink paging resources. Sidelink paging resources may also be configured so that paging may be performed in time and frequency domain resources shared with regular sidelink transmissions. In such cases, sidelink paging data and other data may be carried in sidelink paging resources allocated for sidelink paging, but sidelink paging data may only be carried in in the sidelink paging resources allocated for sidelink paging.

In some cases, certain symbols within a slot may be reserved for paging, in a manner similar to PSFCH resources. For example, a last symbol for slots of a subcarrier may be used for a paging symbol 1252, as shown in resource grid 1250, for paging information instead of PSFCH 1254. In other cases, the paging symbol 1252 may be carried in symbols of a slot across the set of subcarriers in the frequency domain. In some cases, the paging symbol may be multiplexed, such as by using frequency domain multiplexing, with the PSFCH such that both paging information and PSFCH information may be included in a symbol. For example, the PSFCH may not need the full frequency allocation and paging information may be included in the remaining frequency resources. In some cases, the periodicity of the paging symbol may be different from the periodicity of the PSFCH. For example, the paging symbol may be included in every other slot, while the PSFCH may be included with each slot.

In some cases, a number of paging resources may be reduced. For example, a first wireless device may be communicating with a peer wireless device via a sidelink. The sidelink may have been previously configured with sidelink paging resources. Reducing a number of paging resources may help wireless devices adjust to changing demand and reduce power consumption.

Figures 13A, 13B:
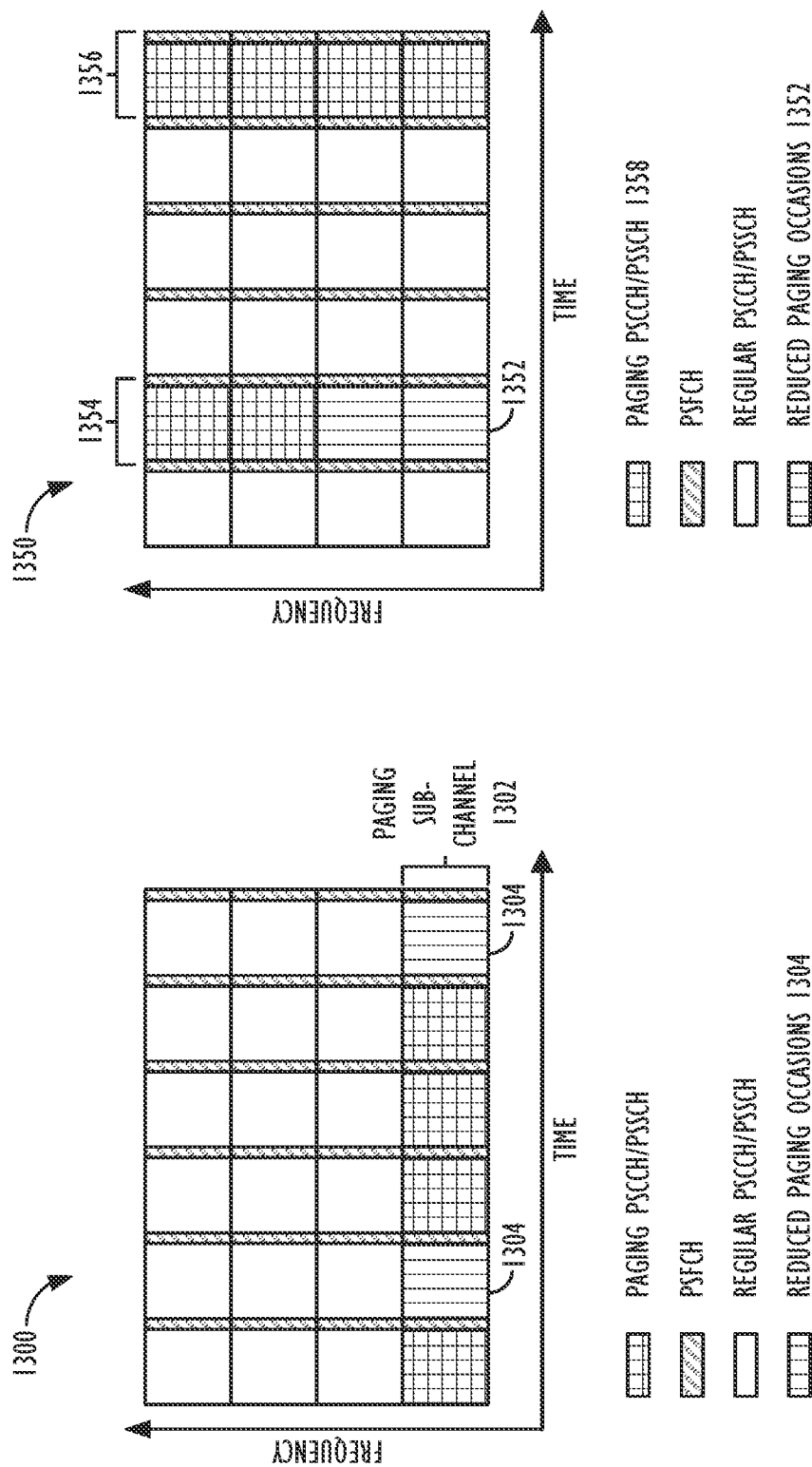
FIGS. 13A and 14B are resource grids illustrating reduced paging occasions for sidelink paging, in accordance with aspects of the present disclosure.

FIGS. 13A and 13B are resource grids illustrating reduced paging occasions for sidelink paging, in accordance with aspects of the present disclosure. As shown in resource grid 1300 of FIG. 13A, sub-channel 1302 is allocated for sidelink paging. In some cases, there may not be a need for all of the frequency resources allocated for sidelink paging. For example, the wireless devices may be largely stationary or in a remote location. The wireless devices may then negotiate, for example, via PC5-RRC messaging, to reduce a number of paging occasions from the allocated sidelink paging resources. During these reduced paging occasions 1304, the wireless devices may enter a lower power mode, such as a sleep mode, to help conserve power. In some cases, this reduction may be negotiated as between pairs of wireless devices in an established sidelink session and the reduction may be on a per sidelink session basis. Reducing paging occasions 1352 may also be performed in the frequency domain, as shown in resource grid 1350. During these reduced paging occasions 1352, the wireless devices may not need to monitor certain sub-channels, which may simplify decoding or allow portions of a wireless received to be powered down. In some cases, reduced paging occasions 1352 may be associated with a different periodicity as compared to the paging occasions. For example, the periodicity of the reduced paging occasions 1352 may be greater than the periodicity of the sidelink paging resources. As a more detailed example, the periodicity of the reduced paging occasions 1352 may be double the periodicity of the sidelink paging occasions 1358 so every other sidelink paging occasion 1358 includes reduces paging occasions 1358. As shown, slot 1354 includes reduced paging occasions 1352, but slot 1356 does not.

Sidelink Paging Resource Selection

When a wireless device has been configured with paging resources and has set up a sidelink session with a peer wireless device, if the wireless device has data to transmit to the peer wireless device, the wireless device may page the peer wireless device to cause the peer wireless device to monitor the sidelink resources pool. Prior to paging the peer wireless device, the wireless device may first select a first paging resource, from the paging resources, to use to page the peer wireless device. In some cases, the wireless device may randomly select a first paging resource from the configured paging resources and transmit a paging message on the selected first paging resource. This random selection and transmission may be performed without first sensing the medium. In other cases, the wireless device may partially sense the paging resources before selecting the first paging resource. For example, the wireless device may periodically listen on the paging resources to sense whether other devices are transmitting on the paging resources and then selecting the first paging resource based on whether the wireless device heard another device accessing one or more portions of the paging resources. In other cases, the wireless device may fully sense the sidelink paging resources prior to selecting the first paging resource. For example, the wireless device may continuously sense the sidelink paging resources for a time period to determine whether other devices are transmitting on the sidelink paging resources and then selecting the first paging resource based on whether the wireless device heard another device accessing one or more portions of the paging resources.

In some cases, the wireless device may partially sense across the sidelink resources pool prior to selecting the first paging resource. For example, the wireless device may periodically sense the sidelink resources of the sidelink resource pool to determine what resources may be used by another wireless device. Based on this sensing, the wireless device may select the first paging resource from the sidelink paging resources. In other cases, the wireless device may fully sense the sidelink resources pool prior to selecting the first paging resource. For example, the wireless device may continuously sense the sidelink resources of the sidelink resources pool for a time period to determine whether other devices are transmitting on the sidelink resources of the sidelink resources pool and then selecting the first paging resource based on whether the wireless device heard another device accessing one or more portions of the sidelink resources pool.

Sidelink Paging Message Contents

In accordance with aspects of the present disclosure, contents of the sidelink paging message may include an identifier for the paging source and an identifier for the paging destination. For example, the sidelink paging message may include a paging source identifier for the wireless device transmitting the paging message and a paging destination identifier for the target peer wireless device. In some cases, these identifiers may be unique identifiers exchanged during establishment of the sitelink session.

The sidelink paging message may also include time information related to the sidelink data transmission associated with the sidelink paging message. As discussed above, the wireless device may page the peer wireless device causing the peer wireless device to monitor the sidelink resources pool. The time information may be used to tell the peer wireless device when to expect a data transmission from the wireless device. The peer wireless device may then listen during that time period to receive the data transmission from the wireless device.

Figure 14A:
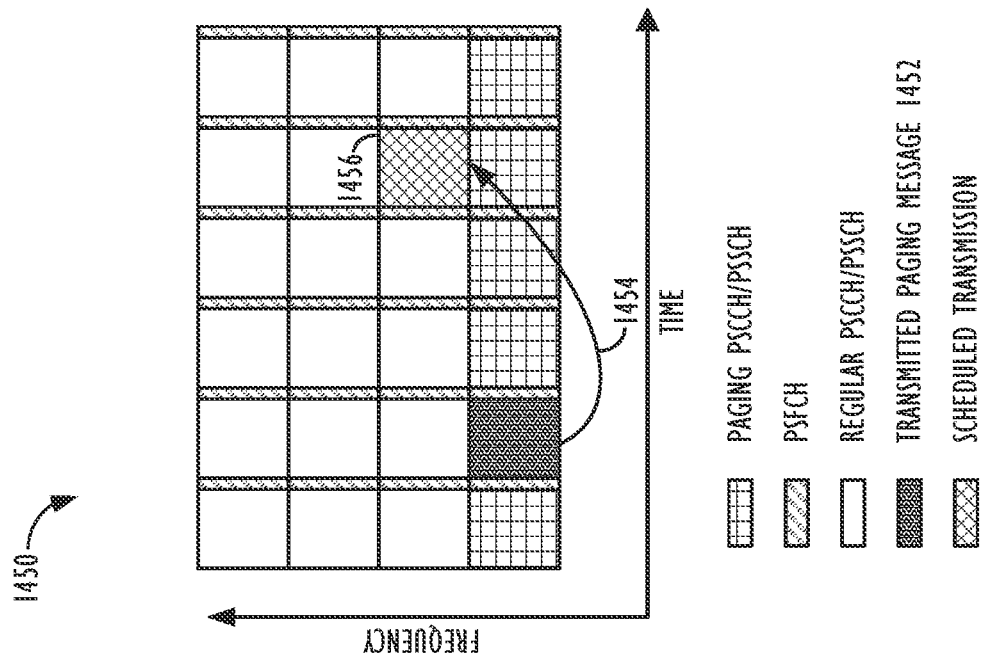
Figure 14B:
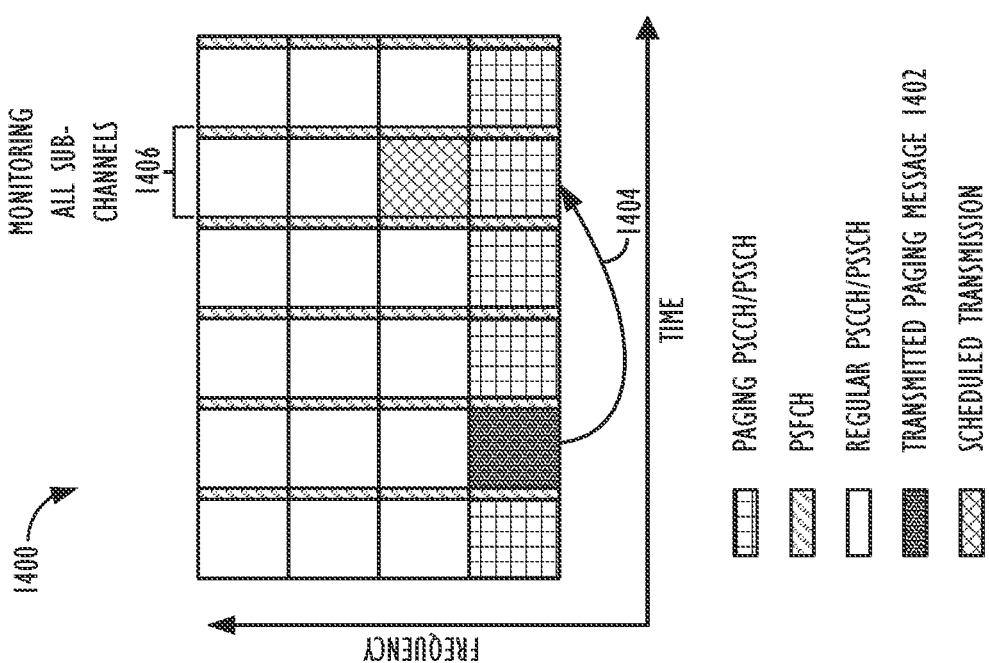

FIGS. 14A and 14B are resource grids illustrating monitoring in response to paging, in accordance to aspects of the present disclosure. In some cases, the time information may indicate a time period when the wireless device intends to transmit. For example, in resource grid 1400, the wireless device may transmit a paging message 1402 including time information. The time information may indicate 1404 a time or number of slots/frames/subframes/etc. from the current slot when the wireless device will begin transmitting to the peer wireless device. The peer wireless device may then monitor all of the sub-channels of the sidelink resources pool based on the time information. In some cases, as shown in resource grid 1450, the time information in the transmitted paging message 1452 may indicate 1454 a time or number of slots/frames/subframes/etc. from the current slot, along with sub-channel index and sub-channel number for the sidelink data transmission 1456. The peer wireless device may then monitor the specified sub-channel at the specified time for based on the time information.

In some cases, the sidelink paging message may be in a sidelink control information (SCI) format for transmission on the PSCCH. The SCI format may include multiple stages with different formats. For example, SCI stage 1 format may be relatively restricted with a defined resource reservation field, number of sub-channels, fixed modulation and coding scheme (MCS) and beta offset. In some cases, sidelink paging information may be carried in a SCI stage 2 format. In some cases, a new SCI stage 2 format may be defined for sidelink paging to include the paging source identifier, paging destination identifier, and, in some cases, time information related to the sidelink data transmission. In some cases, the SC stage 1 format may be reused for sidelink paging information. For example, the SCI stage 1 format may include a reserved bit. The SCI stage 1 format may be modified and the reserved bit may be used to indicate that the SCI stage 1 formatted message is a paging message. Additionally, the resource reservation period field may be omitted, a frequency resource assignment field may be used to indicate a number of sub-channels for the sidelink data transmission. A modified SCI stage 2 formatted message may be associated with the modified SCI stage 1 message. This modified SCI stage 2 message may be in a SCI stage format 2-A format. Under this framework, the fields of a hybrid automatic repeat request (HARQ) process ID, new data indicator (NDI), redundancy version (RV), channel state information (CSI) requests are reserved. In some cases, the paging message may be transmitted as data in on the PSSCH. The source ID and destination ID may be in the modified SCI stage 2 message.

Sidelink Paging Acknowledgment

After receiving a sidelink paging message, a receiving peer wireless device may acknowledge receiving the sidelink paging message. In some cases, the acknowledgement may be performed by the physical layer. For example, after the receiving peer wireless device receives and decodes the sidelink paging message, the receiving peer wireless device may transmit an acknowledgment message on the PSFCH to the transmitting wireless device based on the paging source identifier. In certain cases, PSFCH resources for paging messages may be either configured with PSFCH resource configuration or sidelink paging configuration. As an example of PSFCH resource mapping, in the time domain, there may be defined or configured time gap between a sidelink paging resource for receiving the paging message, and a PFSCH resource allocated for acknowledging the paging message. Similarly, in the frequency domain, there may be a defined or configured frequency location relationship as between a sidelink paging resource for receiving the paging message, and a PFSCH resource allocated for acknowledging the paging message. Resource mapping as between a received paging message and a PSFCH resource may be configured, for example, during sidelink paging configuration. In some cases, resource mapping may be preconfigured, for example, based on a defined standard.

In some cases, the acknowledgment may be sent by a higher level process above the physical layer. A handshaking procedure may be applied in such cases. In some cases, the acknowledgment may be transmitted in the PSCCH. For example, a SCI format 1-A message may be modified to include a bit to indicate that a paging message was received.

In some cases, a wireless device listening for sidelink paging may enter a relatively lower power state when the wireless device is not listening during a sidelink paging occasion, receiving a data transmission, processing received data, etc. In some cases, the wireless device may enter the lower power state based on a timer. For example, if no active transmission/receptions are on-going, the wireless device may start a timer. After the timer concludes and there are no additional transmissions/receptions for the wireless device during the timer, the wireless device may enter the lower power state. A length of such a timer may be adjusted, for example, based on the specific wireless device and may depend, for example, on a power capability of the wireless device. In some cases, the length of the timer may also depend based on a sidelink session configuration of the sidelink session. For example, if a wireless device is configured as a master wireless device for a sidelink session, the timer may be configured for a relatively longer time, allowing the device to remain active more often. If the wireless device is configured as a slave wireless device for the sidelink session, the timer may be configured for a relatively shorter time.

In some cases, entering the lower power state may be based on a triggering message. For example, a transmitting wireless device, such as a master wireless device for the sidelink session, may transmit a lower power state triggering message to a peer wireless device to cause the peer wireless device to enter the lower power state. As another example, a transmitting wireless device, such as a master wireless device for the sidelink session, may transmit a lower power state triggering message to a peer wireless device to indicate to the peer wireless device that the peer wireless device may enter the lower power state. The peer wireless device may then determine whether to enter the lower power state, for example, based on a timer.

EXAMPLES

In the following sections, further exemplary aspects are provided.

According to Example 1, a method for power saving for a wireless device, comprising: determining, by a first wireless device, a set of resources for communicating directly with a second wireless device the set of resources including a first set of paging resources; establishing a sidelink session with the second wireless device based on the set of resources; entering, by the first wireless device, a reduced power state; monitoring, by the first wireless device and based on the paging schedule, the first set of paging resources; receiving, from the second wireless device, a paging message; exiting the reduced power state based on the received paging message; and monitoring, based on the received paging message, the set of resources.

Example 2 comprises the subject matter of example 1, wherein the first set of paging resources comprise a one or more sub-channels.

Example 3 comprises the subject matter of example 2, wherein the one or more sub-channels are dedicated for paging.

Example 4 comprises the subject matter of any of examples 2 or 3, wherein the one or more sub-channels are configured with a physical sidelink feedback channel.

Example 5 comprises the subject matter of example 2, wherein the one or more sub-channels are associated with a different sub-channel size than another sidelink sub-channel.

Example 6 comprises the subject matter of example 1, wherein the first set of paging resources comprise at least a portion of one or more slots.

Example 7 comprises the subject matter of example 6, wherein the at least a portion of one or more slots are dedicated for paging.

Example 8 comprises the subject matter of any of examples 6 or 7, wherein the at least a portion of one or more slots are configured with a physical sidelink feedback channel.

Example 9 comprises the subject matter of example 1, wherein the first set of paging resources comprise one or more dedicated resource blocks.

Example 10 comprises the subject matter of example 1, wherein the first set of paging resources comprise one or more dedicated symbols in a slot.

Example 11 comprises the subject matter of example 10, wherein the first set of paging resources are frequency domain multiplexed with a physical sidelink feedback channel.

Example 12 comprises the subject matter of any of examples 1-11, further comprising: selecting a subset of the first set of paging resources; transmitting, to the second wireless device, an indication of the selected subset of the first set of paging resources; receiving, by the first wireless device, a configuration message, the configuration message indicating a second set of paging resources for the first wireless device; and monitoring the selected subset of the set of paging resources.

Example 13 comprises the subject matter of example 1, wherein the paging message includes an identifier for the first wireless device and an identifier for the second wireless device.

Example 14 comprises the subject matter of example 13, wherein the paging message includes an indication of a starting time to monitor for a sidelink transmission.

Example 15 comprises the subject matter of example 12, wherein the paging message further includes an indication of a sub-channel and a time to monitor for the sidelink transmission.

Example 16 comprises the subject matter of any of examples 13-15, wherein the paging message is received on a physical sidelink shared channel (PSSCH).

Example 17 comprises the subject matter of any of examples 13-15, wherein the paging message is included in a sidelink control information (SCI) message received on one of a physical sidelink shared channel (PSSCH) or a physical sidelink control channel (PSCCH).

Example 18 comprises the subject matter of examples 13-15, wherein the paging message is included in a sidelink control information (SCI) message included in a physical sidelink control channel, wherein the paging message includes an indication that the SCI message is a paging message.

Example 19 comprises the subject matter of example 1, further comprising transmitting, to the second wireless device, an acknowledgment message in response to the received paging message.

Example 20 comprises the subject matter of example 19, wherein the acknowledgement message is transmitted in a physical sidelink feedback channel (PSFCH).

Example 21 comprises the subject matter of example 19, wherein the acknowledgement message is transmitted in a physical sidelink control channel in a sidelink control information (SCI) message.

Example 22 comprises the subject matter of example 1, wherein entering the reduced power state is based on a timer.

Example 23 comprises the subject matter of example 1, further comprising: receiving, by the first wireless device, a reduced power trigger message, and wherein entering the reduced power state is based on the received reduced power trigger message.

According to example 24, a method for power saving for a wireless device, comprising: determining, by a first wireless device, a set of resources for communicating directly with a second wireless device, the set of resources including a first set of paging resources; establishing a sidelink session with the second wireless device based on the set of resources; determining to transmit data to the second wireless device; selecting a paging resource, of the first set of paging resources for transmitting a paging message, transmitting, to the second wireless device, the paging message on the determined paging resource; and transmitting, to the second wireless device, the data.

Example 25 comprises the subject matter of example 24, wherein the first set of paging resources comprise a one or more sub-channels.

Example 26 comprises the subject matter of example 24, wherein the one or more sub-channels are dedicated for paging.

Example 27 comprises the subject matter of any of examples 25 or 26, wherein the one or more sub-channels are configured with a physical sidelink feedback channel.

Example 28 comprises the subject matter of example 25, wherein the one or more sub-channels are associated with a different sub-channel size than another sidelink sub-channel.

Example 29 comprises the subject matter of example 24, wherein the first set of paging resources comprise at least a portion of one or more slots.

Example 30 comprises the subject matter of example 29, wherein the at least a portion of one or more slots are dedicated for paging.

Example 31 comprises the subject matter of any of examples 29 or 30, wherein the at least a portion of one or more slots are configured with a physical sidelink feedback channel.

Example 32 comprises the subject matter of example 24, wherein the first set of paging resources comprise one or more dedicated resource blocks.

Example 33 comprises the subject matter of example 24, wherein the first set of paging resources comprise one or more dedicated symbols in a slot.

Example 34 comprises the subject matter of example 24, further comprising: receiving, by the first wireless device, an indication of a selected subset of the first set of paging resources; selecting a second set of paging resources based on the indicated selected subset; and transmitting, to the second wireless device, a configuration message, the configuration message indicating the second set of paging resources for the first wireless device.

Example 35 comprises the subject matter of example 24, further comprising transmitting, by the first wireless device, a reduced power trigger message.

Example 36 comprises the subject matter of any of examples 24-35, wherein selecting the paging resource comprises randomly selecting the paging resources from the first or second set of paging resources.

Example 37 comprises the subject matter of any of examples 24-35, wherein selecting the paging resource comprises: monitoring, by the first wireless device, a set of sensing resources; and determining, based on the monitoring, the paging resource.

Example 38 comprises the subject matter of example 37, wherein the set of sensing resources comprises the paging resources.

Example 39 comprises the subject matter of example 37, wherein the set of sensing resources comprises the set of resources for communicating directly with the second wireless device.

Example 40 comprises the subject matter of example 24, wherein the paging message includes an identifier for the first wireless device and an identifier for the second wireless device.

Example 41 comprises the subject matter of example 40, wherein the paging message includes an indication of a starting time to monitor for a sidelink transmission.

Example 42 comprises the subject matter of example 40, wherein the paging message further includes an indication of a sub-channel and a time to monitor for the sidelink transmission.

Example 43 comprises the subject matter of any of examples 37-42, wherein the paging message is received on a physical sidelink shared channel (PSSCH).

Example 44 comprises the subject matter of examples 2942, wherein the paging message is included in a sidelink control information (SCI) message on one of a physical sidelink shared channel (PSSCH) or a physical sidelink control channel (PSCCH).

Example 45 comprises the subject matter of examples 2942, wherein the paging message is included in a sidelink control information (SCI) message included in a physical sidelink control channel, wherein the paging message includes an indication that the SCI message is a paging message.

Example 46 comprises the subject matter of example 24, further comprising receiving, to the second wireless device, an acknowledgment message in response to the received paging message Example 47 comprises the subject matter of example 46, wherein the acknowledgement message is received in a physical sidelink feedback channel (PSFCH).

Example 48 comprises the subject matter of example 46, wherein the acknowledgement message is received in a physical sidelink control channel in a sidelink control information (SCI) message.

Example 49 comprises the subject matter of example 24, further comprising entering a reduced power state based at least in part on the set of paging resources.

Example 50 comprises the subject matter of example 49, wherein entering the reduced power state is based on a timer.

According to Example 51, a method that includes any action or combination of actions as substantially described herein in the Detailed Description.

According to Example 52, a method as substantially described herein with reference to each or any combination of the Figures included herein or with reference to each or any combination of paragraphs in the Detailed Description.

According to Example 53, a wireless device configured to perform any action or combination of actions as substantially described herein in the Detailed Description as included in the wireless device.

According to Example 54, a wireless station configured to perform any action or combination of actions as substantially described herein in the Detailed Description as included in the wireless station.

According to Example 55, a non-volatile computer-readable medium that stores instructions that, when executed, cause the performance of any action or combination of actions as substantially described herein in the Detailed Description.

According to Example 56, an integrated circuit configured to perform any action or combination of actions as substantially described herein in the Detailed Description.

Yet another exemplary aspect may include a method, comprising, by a device, performing any or all parts of the preceding Examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding Examples.

Yet another exemplary aspect may include an apparatus comprising means for performing any or all of the elements of any of the preceding Examples.

Still another exemplary aspect may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method for power saving for a first wireless device, comprising:
    determining a set of resources for communicating directly with a second wireless device, the set of resources including a first set of paging resources, wherein the first set of paging resources comprises one or more sub-channels and the one or more sub-channels are associated with a different sub-channel size than another sidelink sub-channel;
    establishing a sidelink session with the second wireless device based on the set of resources;
    entering a reduced power state;
    monitoring, based on a paging schedule, the first set of paging resources;
    receiving, from the second wireless device, a paging message, wherein the paging message includes an identifier for the first wireless device and an identifier for the second wireless device;
    exiting the reduced power state based on the received paging message; and monitoring, based on the received paging message, the set of resources.

2. The method of claim 1, wherein the one or more sub-channels are configured with a physical sidelink feedback channel.

3. The method of claim 1, wherein the first set of paging resources comprises at least a portion of one or more slots.

4. The method of claim 1, wherein the first set of paging resources comprises one or more dedicated resource blocks.

5. The method of claim 1, wherein the first set of paging resources comprises one or more dedicated symbols in a slot.

6. The method of claim 1, further comprising:
selecting a subset of the first set of paging resources;
transmitting, to the second wireless device, an indication of the selected subset of the first set of paging resources;
receiving a configuration message, the configuration message indicating a second set of paging resources for the first wireless device; and
monitoring the selected subset of the set of paging resources.

7. The method of claim 6 wherein the paging message further includes an indication of a sub-channel and a time to monitor for the sidelink transmission.

8. The method of claim 1, wherein the paging message includes an indication of a starting time to monitor for a sidelink transmission.

9. The method of claim 1, wherein the paging message is received on a physical sidelink shared channel (PSSCH).

10. The method of claim 1, wherein the paging message is included in a sidelink control information (SCI) message received on one of a physical sidelink shared channel (PSSCH) or a physical sidelink control channel (PSCCH).

11. The method of claim 1, wherein the paging message is included in a sidelink control information (SCI) message included in a physical sidelink control channel, wherein the paging message includes an indication that the SCI message is a paging message.

12. The method of claim 1, further comprising transmitting, to the second wireless device, an acknowledgment message in response to the received paging message.

13. The method of claim 1, further comprising:
receiving a reduced power trigger message, and wherein entering the reduced power state is based on the received reduced power trigger message.

14. An integrated circuit configured to cause a first wireless device to:
determine a set of resources for communicating directly with a second wireless device, the set of resources including a first set of paging resources, wherein the first set of paging resources comprises one or more sub-channels and the one or more sub-channels are associated with a different sub-channel size than another sidelink sub-channel;
establish a sidelink session with the second wireless device based on the set of resources;
enter a reduced power state;
monitor based on the paging schedule, the first set of paging resources;
receive, from the second wireless device, a paging message, wherein the paging message includes an identifier for the first wireless device and an identifier for the second wireless device;
exit the reduced power state based on the received paging message; and
monitor, based on the received paging message, the set of resources.

15. The integrated circuit of claim 14, wherein the one or more sub-channels are configured with a physical sidelink feedback channel.

16. A wireless device comprising:
an antenna;
a radio operably coupled to the antenna; and
a processor operably coupled to the radio;
wherein the wireless device is configured to:
determine a set of resources for communicating directly with a second wireless device, the set of resources including a first set of paging resources, wherein the first set of paging resources comprises one or more sub-channels and the one or more sub-channels are associated with a different sub-channel size than another sidelink sub-channel;
establish a sidelink session with the second wireless device based on the set of resources;
enter a reduced power state;
monitor based on the paging schedule, the first set of paging resources;
receive, from the second wireless device, a paging message, wherein the paging message includes an identifier for the wireless device and an identifier for the second wireless device;
exit the reduced power state based on the received paging message; and
monitor, based on the received paging message, the set of resources.

17. The wireless device of claim 16, wherein the one or more sub-channels are configured with a physical sidelink feedback channel.

* * * * *